April 6, 1954 F. MELTREDER ET AL 2,674,715
CONTROL OF HIGH AMPERAGE ELECTRIC CURRENTS
Filed Oct. 16, 1951
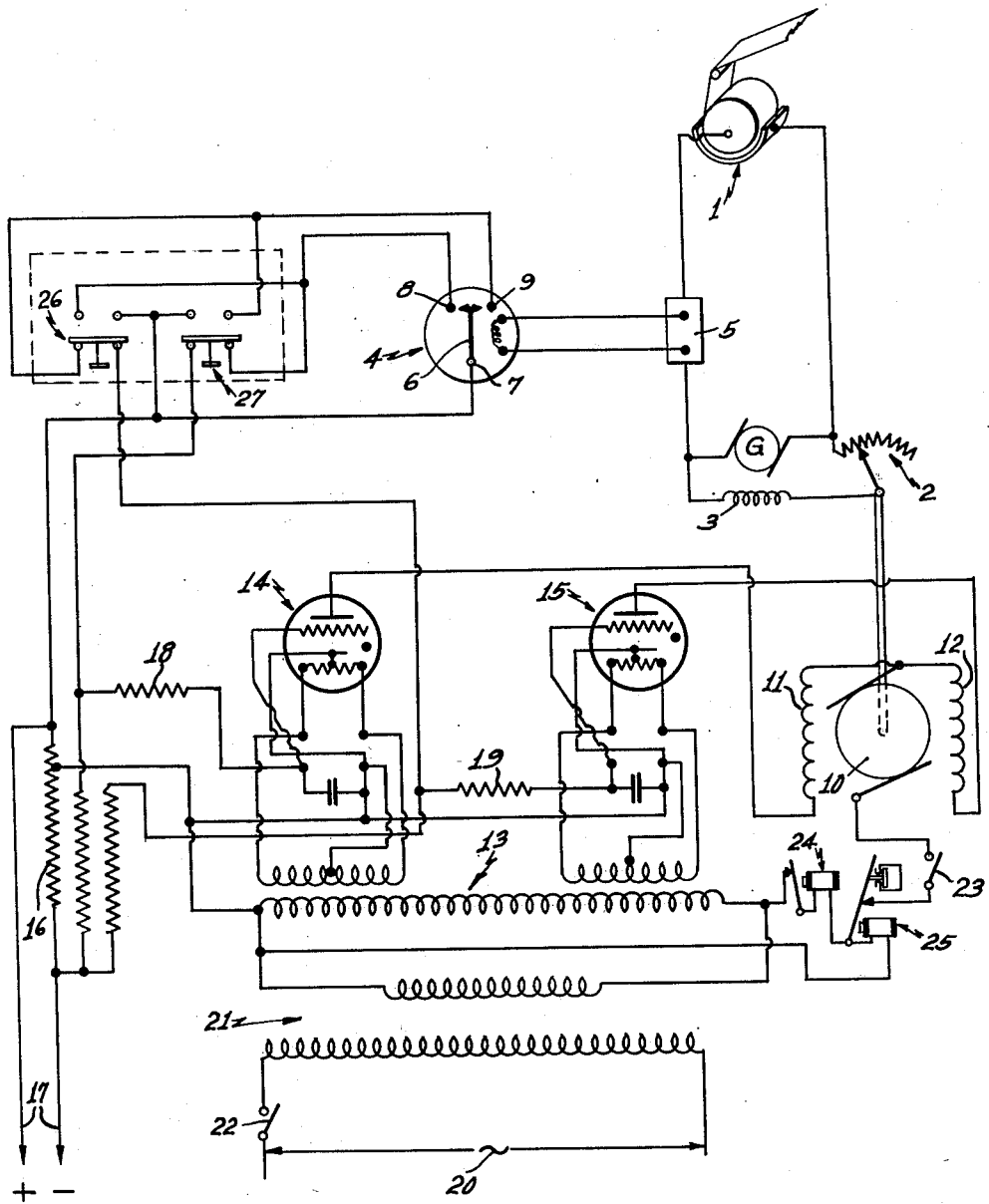
INVENTORS
Frank Meltreder
William C. Noddings
BY
ATTORNEYS Patented Apr. 6, 1954

2,674,715

UNITED STATES PATENT OFFICE 2,674,715

CONTROL OF HIGH AMPERAGE ELECTRIC CURRENTS

Frank Meltreder, Woodbridge, and William C. Noddings, Matawan, N. J., assignors to International Smelting and Refining Company, a corporation of Montana Application October 16, 1951, Serial No. 251,548

3 Claims. (Cl. 322—27)

This invention relates to controlling, within narrowly defined limits, the large electric current consumed at low voltage in large scale electrolytic operations. For example, in the production of sheet copper by electrodeposition of the metal from a copper-bearing electrolyte on to a rotating drum cathode partially immersed in the electrolyte, the thickness of the sheet is supposed to be controlled by the speed at which the drum is rotated. If, however, the amount of current operating to deposit copper on the drum varies appreciably, such variation will affect the thickness of the copper deposit independently of the speed of drum rotation. It is highly desirable in such operations, therefore, to provide for accurate control on the amount of current flowing in the electrolytic cell circuit. Heretofore the only satisfactory means available for effecting such control has been by manual control of the current output of the generator supplying power to the electrolytic cell.

The present invention provides an improved combination, with electrolytic apparatus consuming a large electric current at low voltage connected in circuit with a generator for producing such current, of means for automatically maintaining the current in the electrolytic apparatus circuit within a predetermined range. The control means comprises a single-pole double-throw current-responsive relay connected in the generator output circuit. Such relay is held in an open neutral position when current flow in the electrolytic apparatus circuit is within the desired predetermined range, but it closes in one direction when said current increases to above such range and it closes in the other direction when such current decreases to below such range. The generator is of the type having a rheostat-controlled field winding for regulating its current, and the control apparatus includes a control motor having its shaft connected to such rheostat. The motor is connected to a power source through the anodes of a pair of grid-controlled gas-filled rectifier tubes, being energized to rotate in one direction when one of said tubes conducts and being energized to rotate in the opposite direction when the other of said tubes conducts. Circuit means are provided for normally biasing the grids of the tubes to a sufficient negative potential with respect to the cathodes so as to prevent said tubes from conducting, and further circuit means are provided for discharging such grid bias on one of the tubes through one throw of the relay and for discharging the grid bias of the other of said tubes through the other of the throws of the relay. Thus, when the current output of the generator departs from within the aforesaid predetermined range, the relay closes with one of its throws and thereby causes one of the rectifier tubes to conduct and so to energize the motor to rotate the generator field rheostat in a direction to return the current flow in the electrolytic apparatus circuit to within the predetermined range.

A preferred embodiment of the invention is shown schematically in the single figure of the accompanying drawing.

In the drawing, an electrolytic operation for the production of sheet copper is indicated schematically by a cell 1, to which a large electric current is supplied at low voltage by a generator G. The current output of the generator is regulated by a rheostat 2 in series with the generator field winding 3. A single-pole double-throw current-responsive relay 4 is connected across a shunt 5 in the electrolytic cell circuit. The relay comprises essentially a milliammeter movement actuating a movable armature 6 which is electrically connected to a center terminal 7 of the relay and which moves between two spaced fixed contacts 8 and 9. So long as the generator output current remains within a predetermined range, the relay armature remains in a neutral position between the contacts 8 and 9, but whenever said current departs from such range, the armature makes contact with one or the other of the contacts 8 or 9.

The generator field rheostat 2 is mechanically connected to the shaft of a control motor 10. The control motor is a special type direct current series wound motor which differs from conventional motors in that it is provided with two oppositely wound field windings 11 and 12.

The motor is energized from a transformer 13 through the plate circuit of one or the other of a pair of gas-filled rectifier tubes 14 and 15. The circuit connections are such that one of the motor field windings 11 is energized through the plate circuit of one of the tubes 14 so as to cause the motor to rotate in one direction, and the other field winding 12 is energized through the plate circuit of the other tube 15 to cause the motor to rotate in the opposite direction.

The grids of the tubes 14 and 15 are normally biased through a potentiometer 16 from a source of D. C. potential 17 to a sufficient negative potential with respect to the two cathodes so that neither tube conducts, and in consequence the motor 10 does not operate. The bias on the grid of one of the tubes 14 may however be discharged through its grid resistor 18 to the positive side of the potential source by closure of the relay armature contact with one of the fixed contacts 8; and the grid bias of the other tube 15 similarly may be discharged through its grid resistor 19 to the positive side of the potential source 17 by closure of the relay armature contacts with the other of the fixed contacts 9.

The control apparatus described above operates as follows: Whenever the amount of current flowing from the generator G through the electrolytic apparatus circuit departs from the range within which it is intended to be maintained, the movable armature 6 of the relay 4 closes with one or the other of the fixed relay contacts 8 and 9. Thereupon the negative bias on the grid of one or the other of the rectifier tubes 14 and 15 is discharged and that tube becomes conducting, so that the control motor 10 begins to rotate in the direction determined by whichever of its field windings 11 and 12 has become energized. Rotation of the control motor brings about a resetting of the generator field rheostat 2 in a direction to restore the current flowing in the electrolytic apparatus circuit to within the range in which it is intended to be maintained.

Various circuit elements shown in the drawing but not described above are for the most part more or less conventional. The rectifier tube cathode circuits and the control motor are energized from an A. C. power source 20 through an isolating transformer 21. Conventional on-off switches 22 and 23 are included in the power supply and motor circuits. Also, a conventional circuit breaker 24 and a delay-on-closing relay 25 are incorporated in the control motor circuit; the latter, having a delay period of the order of one minute between energization of its coil and closure of its contacts, is provided to insure that no load is imposed on the tubes 14 and 15 until after they have warmed up. Push buttons 26 and 27 are provided for effecting manually directed operation of the control motor 10.

Control apparatus as herein described has been employed with marked success in obtaining reliable and accurate control of the current flow through a group of cells employed for the production of electrolytically formed sheet copper. The current flow through the cells is maintained within closely defined limits with no substantial attention on the part of the plant electrician, whereas heretofore it was necessary to give frequent attention to the generator current regulator to insure proper control of the electrolytic current.

We claim:

1. The combination with electrolytic apparatus consuming a large electric current at low voltage connected in circuit with a generator for producing such current, said generator having a rheostat-controlled field winding for regulating its current output, with means for automatically maintaining the current in the electrolytic apparatus circuit within a predetermined range comprising a single-pole double-throw current-responsive relay connected in said circuit, said relay being held in an open neutral position when the current flow in said circuit is within a predetermined range but closing in one direction when said current increases to above said range and closing in the other direction when said current decreases to below said range, a reversible direct current control motor having a shaft connected to the generator field rheostat, a pair of grid-controlled gas-filled rectifier tubes, said motor being connected to a power source through the anodes of each of said tubes, and being energized to rotate in one direction when one of said tubes conducts and being energized to rotate in the opposite direction when the other of said tubes conducts, means normally biasing the grids of said tubes to a sufficient negative potential with respect to the cathodes thereof to prevent said tubes from conducting thereby to prevent said motor from being energized, and circuit means for discharging said grid bias of one of said tubes through one throw of said relay and for discharging the grid bias of the other of said tubes through the other of the throws of said relay, whereby a departure of the current output of the generator from within the aforesaid predetermined range causes said relay to close with one of its throws and thereby causes one of said rectifier tubes to conduct and so energize the motor to rotate the generator field rheostat in a direction to return the current flow in the electrolytic apparatus circuit to within said predetermined range.

2. Control apparatus according to claim 1, characterized in that the relay comprises a milliammeter movement connected across a shunt in the electrolytic apparatus circuit and having an armature electrically connected to one relay terminal and movable between a pair of spaced fixed contacts.

3. Control apparatus according to claim 1, characterized in that the direct current control motor is provided with two oppositely wound field coils, one of said coils being connected in the plate circuit of one of said tubes and the other of said coils being connected in the plate circuit of the other of said tubes.

References Cited in the file of this patent

UNITED STATES PATENTS

| Number | Name | Date |
|---|---|---|
| 1,580,802 | Barton | Apr. 13, 1926 |
| 1,697,183 | Hardy | Jan. 1, 1929 |
| 1,776,151 | Hall | Sept. 16, 1930 |
| 2,297,578 | Noddings | Sept. 29, 1942 |
| 2,309,493 | Bany | Jan. 26, 1943 |

OTHER REFERENCES

"Electronics," vol. 9, #4, McGraw-Hill, New York, New York.